Aug. 30, 1932.　　　　P. BEEN　　　　1,874,859
APPARATUS FOR HANDLING AND STORING
Filed June 18, 1930　　　　2 Sheets-Sheet 1
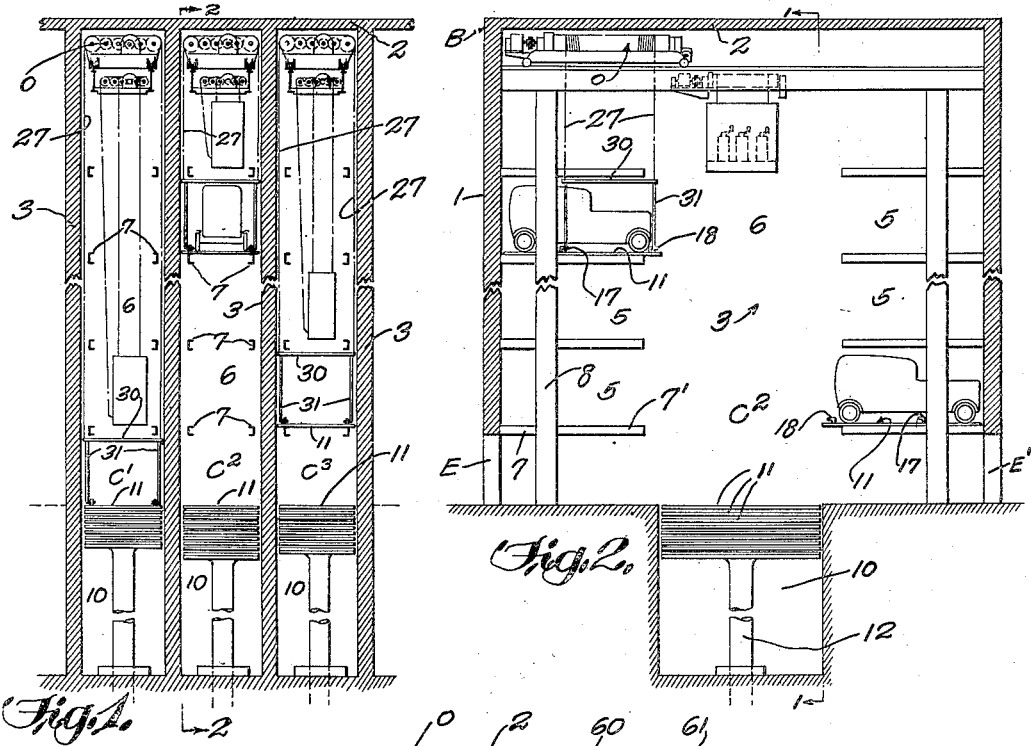

Aug. 30, 1932.   P. BEEN   1,874,859
APPARATUS FOR HANDLING AND STORING
Filed June 18, 1930   2 Sheets-Sheet 2
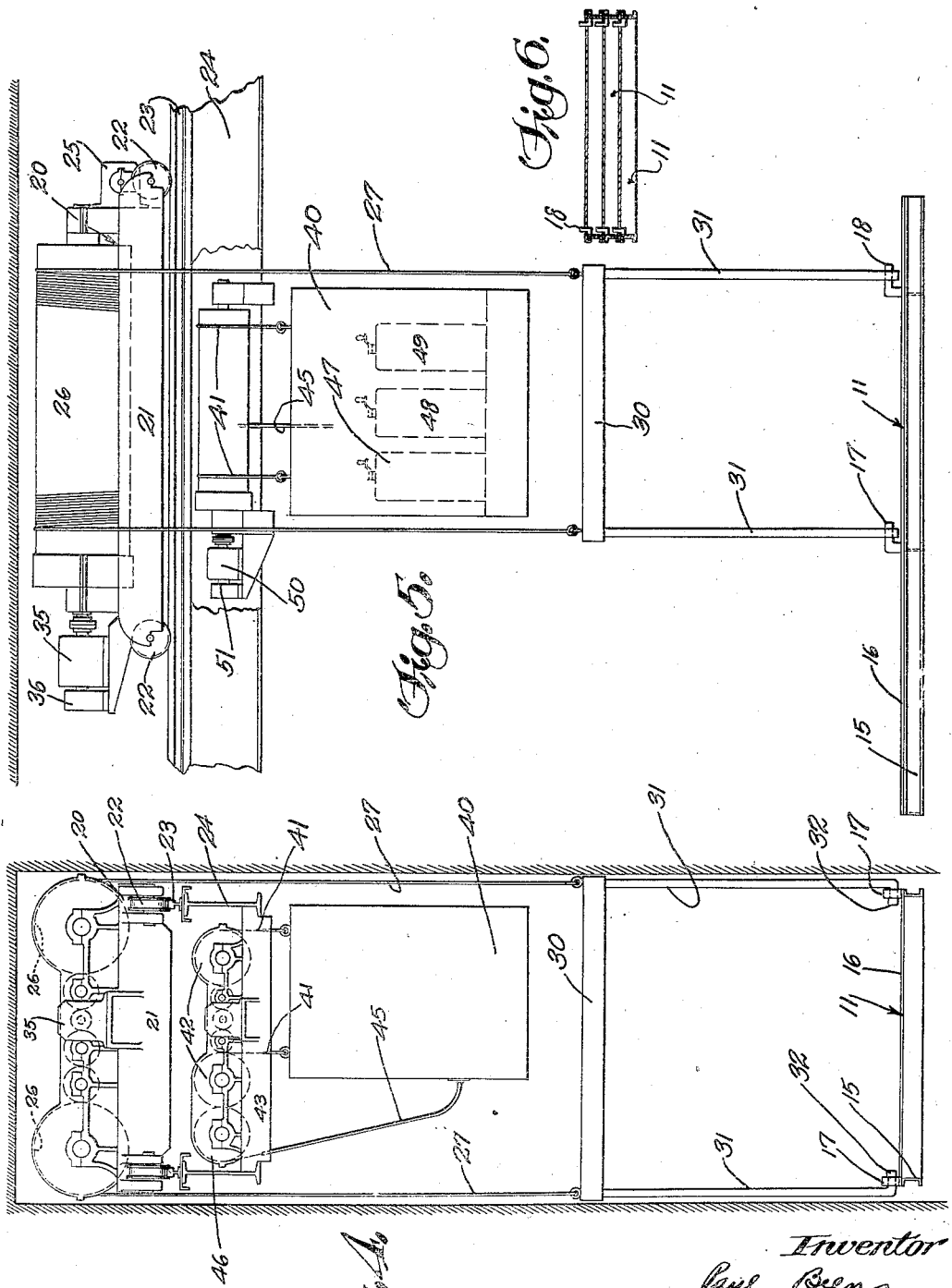

Patented Aug. 30, 1932

1,874,859

UNITED STATES PATENT OFFICE

PAUL BEEN, OF MILWAUKEE, WISCONSIN, ASSIGNOR TO HARNISCHFEGER CORPORATION, OF MILWAUKEE, WISCONSIN, A CORPORATION OF WISCONSIN

APPARATUS FOR HANDLING AND STORING

Application filed June 18, 1930. Serial No. 461,874.

This invention relates to a storage system especially designed and adapted for storing or parking automobiles, although also adapted for other uses and applications.

One of the principal objects of the present invention is to provide a storage system of this character in which the automobiles or articles to be stored may be quickly transferred from the entrance-way of the building embodied in this system to any one of a large number of storage compartments so that a minimum time is required for the parking or retrieving of any automobile.

Another important object is to provide a system of this character which is economical in the use of space within the building and which requires a minimum of structure for storing and handling the articles thereby effecting economy in the cost of the building or system and consequently economy in the parking or storage of the automobiles or other articles.

Another object of the invention is to provide a storage system having these advantages and capacities and which is simple and durable in construction, reliable and effective and speedy in operation, and easy and comparatively inexepensive to manufacture.

In carrying out the present invention, a storage system is provided which includes a building structure embodying any number of units, each consisting of opposed vertical tiers of storage compartments or storage spaces. Each tier of storage spaces consists of vertical supporting members which may be the walls of the building and vertical piers and a series of spaced horizontally disposed floor forming members or supports arranged in the form of cantilevers whereby at least a portion of the base of each storage compartment is spaced along its sides from any of the structure of the building for a substantial portion of its extent.

On the ground floor of the building entrance and exit ways are provided and lead to and from a loading and unloading station which may conveniently consist of a stack of platforms arranged in a pit below the ground floor and supplied one after the other to the ground floor by means of a hydraulic ram or its equivalent. There is one such platform for each automobile or other article to be stored.

For transferring each platform with its automobile thereon from the loading station to a storage space or back from a storage space to the loading station an overhead crane is provided and includes a motor driven traveling truck running on a trackway which overlies the tiers of storage spaces and the well intervening therebetween. Motor driven drums are carried by the truck and are arranged so that the cables wound thereon extend down on the outside of the frame of the truck and the trackway on which it travels and straddle the projecting portions of the base of each storage compartment. The cables at their lower ends carry a grapple designed to engage the platforms and transmit the lifting or hoisting force of the crane to the platforms and the articles carried thereon. This organization of the special features of the crane and storage compartments permits the crane not only to lift and lower each platform with its automobile thereon but to carry the platform and automobile into any storage compartment and deposit it therein and also to retrieve a platform and automobile from any storage space and carry it back to the loading station at the ground floor from which it may be driven from the building.

Usually it will be desirable to provide a separate overhead crane for each pair of opposed tiers of storage compartments in which event the traveling truck of the crane will travel on a trackway carried by a fixed bridge. However, if desired, a single crane may be designed to serve a plurality of pairs of opposed tiers by the simple expedient of utilizing a traveling bridge carrying the trackway for the motor driven truck of the crane and itself supported upon a trackway extending longitudinally of the building and over the plurality of pairs of opposed tiers of storage spaces which the crane serves.

In all forms of the invention it will usually be desirable to provide a separate cage for the operator controlling the action of the crane, the cage being supported for raising and lowering movement on the bridge of the crane. This permits the operator to follow the grapple closely and observe its position and its relation to the other elements of the system. The cage contains the controls regulating the action of the various motors employed for driving the bridge, the truck, the drums and the hoisting means for the cage. The operator, by appropriately manipulating the controllers, will be able to coordinate the movements of the cage with the movements of the grapple, and, if desired, this coordination may be effected automatically by interlocking or appropriately controlling the motors employed for raising and lowering the grapple and for raising and lowering the cage.

Other objects and advantages reside in certain novel features of the construction, arrangement and combination of parts which will be hereinafter more fully described and particularly pointed out in the appended claims, reference being had to the accompanying drawings, forming a part of this specification, and in which:

Figure 1 is a view in longitudinal vertical section taken on line 1—1 of Figure 2 and looking in the direction of the arrows and illustrating generally one embodiment of the invention;

Figure 2 is a view in transverse vertical section taken on line 2—2 of Figure 1 and looking in the direction of the arrows;

Figure 3 is a view similar to Figure 2 but illustrating another embodiment of the invention;

Figure 4 is a view showing the crane, cage, grapple, and platform employed in either form of the invention;

Figure 5 is a view in elevation looking toward the right hand side of Figure 4; and Figure 6 is a fragmentary detail view showing a slight modification in the structure of the platforms.

Referring to the drawings, and more particularly to Figures 1, 2 and 3, it will be seen that the present invention proposes a building construction designated generally at B and which may consist simply of outside walls 1, a roof 2 and partition walls 3 dividing the interior of the building into units or sections designated at $C^1$, $C^2$ and $C^3$. As each of the sections $C^1$, $C^2$ and $C^3$ are of identical construction, a single description will serve for all. At the ground level there is an entrance-way E and an exit-way E' to each section.

Opposed tiers of storage compartments designated generally at 5 are provided in each section and are spaced from each other by an intervening well 6. Each storage compartment includes a base or supporting structure which may consist of a pair of channels 7 supported at their outer ends on the outside walls of the building and supported intermediate their ends on piers 8 so that portions 7' of the channels are spaced from the walls or partitions of the building and from any of the structural elements employed. In other words, a cantilever construction is employed for the base or structure corresponding to the floor of each storage compartment.

Below and communicating with the ground level of each unit of the storage system is a pit 10 containing a plurality of platforms 11 arranged in stack formation and carried by a hydraulic ram 12 which is designed and controlled to feed the stack of platforms upwardly to keep one of the platforms 11 coincident with the surface of the street floor of the building at all times. The details of the construction of the ram and of its control are well known and need no detailed explanation here as these features per se form no part of this invention.

The platforms 11 are shown to advantage in Figures 4 and 5 and, as illustrated, each comprises a marginal frame 15 of channel iron and a top plate 16 secured to this marginal frame. Pairs of hooks 17 and 18 are securely fastened to the plate 16 and to portions of the marginal frame 15. If desired, the hooks 18 and 17 may be offset inwardly from the marginal frame 15 so that the platforms can be nested in the pit, as illustrated in Figure 6. It will be understood from the foregoing that the platforms 11 are of such size and design as to be adapted to receive and support an automobile or other article to be stored, automobiles being driven directly onto the uppermost platform 11 of the stack in the pit. Suitable chocks may be provided on each platform to prevent movement of the automobile thereon.

For the purpose of transferring the platforms from the loading station to any storage compartment and back from any storage compartment to the loading station, an overhead crane, designated generally at O, is provided and consists of a traveling truck designated generally at 20 and having a suitable frame 21 provided with flanged wheels 22 riding on rails 23 of a bridge 24 which extends over each pair of opposed tiers and over the intervening well. The wheels at one end of the truck are driven in accordance with the usual practice by means of a motor 25 suitably geared to the adjacent wheels. At each side of the truck frame 21 a hoisting drum 26 is rotatably supported in suitable bearings. The drums 26 are so organized with the frame that the outer portions of their peripheries project slightly beyond the truck frame as illustrated in Figure 4. This organization of the drums with the truck frame in conjunction with the reeving of the cables 27 illustrated in Figures 4 and 5 disposes the runs of the cables leading downwardly from the drums on the outside of the truck frame 21, bridge 24 and the cantilever portions 7' of the bases or floors of the storage compartments. The cables 27 at their lower ends are connected to a rectangular frame 30 of a grapple, this grapple including not only the frame 30 but also four grapple arms 31, the arms 31 being located at the corners of the frame 30 and terminating at their lower ends in grapple hooks 32 designed to interengage with the hooks 17 and 18 of the platforms 11. The drums 26 are reversely driven by means of an electric motor 35 geared thereto in a conventional manner and having the usual electromagnetic brake 36 or holding the drums in any position when the motor is turned off. It is to be understood that the motor and gearing for driving the drums and for driving the traveling truck is conventional crane equipment and hence needs no detailed explanation.

In order that the operator may closely follow the movements of the grapple, a traveling control cage 40 is provided and is supported by cables 41 wound on drums 42 carried on a frame structure 43 mounted on the bridge 24. A flexible cable 45 is wound on a retrieve drum 46 provided on the frame 43 and connects the controllers 47, 48 and 49 of the cable with the motors employed for driving the drums of the truck, the running gear of the truck and the drums of the hoist for the cage. As shown in Figure 5, the drums 42 which control the raising and lowering of the cable are driven from an electric motor 50 having the conventional electro-magnetic brake 51 associated therewith.

With this construction, an automobile may be driven in through the entrance-way E and onto the uppermost platform of the stack. The operator in the cage manipulates the controllers therein to position the crane and its grapple centrally in the well and then lowers the grapple until its hooks 32 are positioned for interengagement with the hook 17. The operator also lowers the cage 40 at this time so that he can interengage the hooks 32 and 17 by shifting the crane slightly laterally after the hooks 32 have been positioned in the proper vertical plane. Following this the operator causes the crane to raise the grapple and also causes the drums 42 to raise the cage until the platform is alined with the selected storage compartment. The crane is then run one way or the other to position the platform entirely in its storage compartment and it may be deposited therein by slackening on the cables 27 until the hooks 32 disengage the hooks 17 whereupon the platform is supported directly on the channels 7. The crane is then run out of the storage compartment and into the well and, of course, the grapple follows with it.

As shown in the drawings, the books 17 and 18 are arranged more to one end of the platform than to the other, this feature cooperating with the cantilever formation of the storage compartments to provide for the positioning of the platforms entirely within any storage compartment. This arrangement of the hooks requires that the platforms 11 be alternately reversely positioned in the pit in order to avoid continual manual handling of the platforms. This will be understood from an inspection of Figure 2 which illustrates that the platforms in the tiers of storage compartments on one side are oppositely disposed from the platforms of the series of compartments on the other.

The form of the invention shown in Figure 3 is identical with that just described except that in lieu of a fixed bridge 24 a traveling bridge 60 is provided and has wheels 61 running on rails 62 of a longitudinal trackway. The traveling bridge is motor driven by means of an electric motor and gearing (not shown) in accordance with conventional crane practice. The only other modification in the structure of Figure 3 is that the partition 3 must be cut out as at 3' so that the well extending for the full length of all tiers is served by the crane. The arrangement in Figure 3 enables one crane to serve a plurality of opposed tiers of storage compartments but, of course, with a sacrifice of speed of handling, especially disadvantageous during rush hours.

The invention claimed is:

1. A storage system comprising a building having entrance and exit ways and having a pit at the ground level provided with a stack of platforms, means for feeding the platforms to the ground level of the building, a plurality of opposed vertical tiers of storage compartments, there being a well intervening between said opposed vertical tiers and overlying the platforms, and an overhead crane including a traveling truck movable across the well and over either tier of storage compartments and a grapple raised and lowered and moved laterally with said crane and designed to engage any of the platforms to transfer the platforms from the ground level to any storage compartment and vice versa.

2. A storage system including opposed tiers of storage compartments with a well intervening between said storage compartments, each having a cantilever base, an individual platform for each storage compartment, an overhead crane including a motor driven truck movable across the well and over either tier of storage compartments, motor driven hoisting drums carried by said truck and arranged along the sides thereof, cables wound around said drums and extending down along the outsides of the truck and adapted to straddle the projecting portions of the cantilever bases of the storage compartments, and a grapple carried by said cables and engageable with any of the platforms whereby the crane is designed for transferring loaded platforms to and from the storage compartments.

3. A storage system including opposed tiers of storage compartments, each having a cantilever base, an individual platform for each storage compartment adapted to receive and support the article to be stored, an overhead crane including a motor driven truck movable across the well and over either tier of storage compartments, motor driven hoisting drums carried by said truck and arranged along the sides thereof, cables wound around said drums and extending down along the outsides of the truck and adapted to straddle the projecting portions of the cantilever bases of the storage compartments, a grapple carried by said cables and engageable with any of the platforms whereby the crane is designed for transferring loaded platforms to and from the storage compartments, and a traveling cage having the controllers for the motors of the crane and for the motors of its hoisting mechanism.

4. A storage system including opposed tiers of storage compartments, each having a cantilever base, an individual platform for each storage compartment, an overhead crane including a motor driven truck movable across the well and over either tier of storage compartments, motor driven hoisting drums carried by said truck and arranged along the sides thereof, cables wound around said drums and extending down along the outsides of the truck and adapted to straddle the projecting portions of the cantilever bases of the storage compartments, a grapple carried by said cables and engageable with any of the platforms whereby the crane is designed for transferring loaded platforms to and from the storage compartments, said platforms being arranged in a stack, and means for feeding the platforms one by one to the ground level of the building.

5. A storage system comprising a building structure having opposed tiers of storage compartments, each storage compartment having its base in the form of a cantilever whereby a substantial portion of the base of each storage compartment is spaced from the other elements of the building, an individual platform for each storage compartment and an overhead crane having cables designed to straddle the spaced portions of the base of each storage compartment and provided with means for engaging each platform whereby the crane is effective to transfer platforms to and from the storage compartments.

6. A storage system including a tier of storage compartments, each storage compartment having a cantilever base, a plurality of loading platforms, each adapted to receive and support an article to be stored, a motor driven truck positioned above and movable longitudinally of the tier of storage compartments and out beyond the entrances to the same, motor driven hoisting drums carried by said truck and arranged along the sides thereof, cables secured to and wound around said drums and extending down along the outsides of the truck and adapted to straddle the projecting portions of the cantilever bases of the storage compartments, and a grapple carried by said cables and raised and lowered thereby and moved longitudinally with said truck for transferring loaded platforms to and from the storage compartments.

7. A storage system including a tier of storage compartments, each storage compartment having a cantilever base, a plurality of loading platforms, each loading platform being designed and adapted to receive and support an article to be stored, and also being adapted to be deposited in a storage compartment and to rest on the cantilever base thereof, and means for transferring the loaded platforms to and from the storage compartments and including supporting cables adapted to straddle the cantilever base.

8. A storage system comprising a building having entrance and exit ways and provided with a loading station at the ground level, a tier of storage compartments, a plurality of portable platforms, there being an individual platform for each storage compartment, each platform being designed to receive and support an automobile, means supporting each platform at the loading station so that an automobile may be run directly thereon, an overhead crane including a traveling truck movable over the tier of the storage compartments and a grapple raised and lowered and moved laterally with said truck and designed to engage a platform supported at the loading station and to transfer the platforms from the loading station to any storage compartment and vice versa.

In witness whereof, I hereto affix my signature.

PAUL BEEN.